(12) United States Patent
Martinelli et al.

(10) Patent No.: US 10,411,825 B2
(45) Date of Patent: Sep. 10, 2019

(54) APPARATUS FOR TRANSMITTING OPTICAL SIGNALS BETWEEN A CENTRAL UNIT AND AT LEAST ONE REMOTE UNIT

(71) Applicant: POLITECNICO DI MILANO, Milan (IT)

(72) Inventors: Mario Martinelli, San Donato Milanese (IT); Umberto Spagnolini, Milan (IT)

(73) Assignee: POLITECNICO DI MILANO, Milan (IT)

( * ) Notice: Subject to any disclaimer, the term of this patent is extended or adjusted under 35 U.S.C. 154(b) by 0 days.

(21) Appl. No.: 15/575,203

(22) PCT Filed: May 17, 2016

(86) PCT No.: PCT/IB2016/052867
§ 371 (c)(1),
(2) Date: Nov. 17, 2017

(87) PCT Pub. No.: WO2016/185382
PCT Pub. Date: Nov. 24, 2016

(65) Prior Publication Data
US 2018/0152260 A1 May 31, 2018

(30) Foreign Application Priority Data
May 18, 2015 (IT) .......................... 102015000015525

(51) Int. Cl.
*H04B 10/00* (2013.01)
*H04J 14/00* (2006.01)
(Continued)

(52) U.S. Cl.
CPC ...... *H04J 14/0245* (2013.01); *H04B 10/2587* (2013.01); *H04B 10/27* (2013.01);
(Continued)

(58) Field of Classification Search
CPC .. H04B 10/2587; H04J 14/06; H04J 14/0228; H04J 14/025; H04J 14/0252
See application file for complete search history.

(56) References Cited

U.S. PATENT DOCUMENTS

| 2011/0135309 A1* | 6/2011 | Lee | H04B 10/2587 398/79 |
| 2014/0348507 A1* | 11/2014 | Zhou | H04B 10/2587 398/65 |

FOREIGN PATENT DOCUMENTS

| EP | 2 698 933 | 2/2014 |
| EP | 2 797 337 | 10/2014 |
| EP | 2 840 728 | 2/2015 |

OTHER PUBLICATIONS

International Search Report dated Aug. 17, 2016 in International Application No. PCT/IB2016/052867.
(Continued)

*Primary Examiner* — Daniel G Dobson
(74) *Attorney, Agent, or Firm* — Wenderoth, Lind & Ponack, L.L.P.

(57) ABSTRACT

An apparatus for transmitting optical signals between a central unit (1) and at least one remote unit (2), said central unit comprising—at least one amplified spontaneous emission source (11, 110) of an optical signal, first means (17, 170) adapted to polarize the optical signal deriving from the amplified spontaneous emission source in a first polarization plane by forming a first polarized optical signal (POS). The apparatus comprises second means (24) configured to receive said first polarized optical signal and to polarize it in a second polarization plane, orthogonal to the first plane, by forming in said first means a second optical signal (SOS) which is orthogonally polarized with respect to the first optical signal (17).

7 Claims, 2 Drawing Sheets

(51) Int. Cl.

| | |
|---|---|
| *H04J 14/02* | (2006.01) |
| *H04J 14/06* | (2006.01) |
| *H04B 10/27* | (2013.01) |
| *H04B 10/50* | (2013.01) |
| *H04B 10/2587* | (2013.01) |
| *H04B 10/272* | (2013.01) |
| *H04B 10/60* | (2013.01) |

(52) U.S. Cl.
CPC ............ *H04B 10/272* (2013.01); *H04B 10/50* (2013.01); *H04J 14/06* (2013.01); *H04B 10/60* (2013.01)

(56) References Cited

OTHER PUBLICATIONS

Written Opinion of the International Searching Authority dated Aug. 17, 2016 in International Application No. PCT/IB2016/053867.

Mario Martinelli et al., "Polarization in Retracing Circuits for WDM-PON", IEEE Photonics Technology Letters, IEEE Service Center, Piscataway, NJ, US, vol. 24, No. 14, Jul. 1, 2012, pp. 1191-1193, XP011446205.

Joon-Young Kim et al., "400 Gb/s (40 10 Gb/s) ASE injection seeded WDM-PON based on SOA-REAM", Optical Fiber Communication Conference and Exposition and the National Fiber Optic Engineers Conference (OFC/NFOEC), 2013, IEEE, Mar. 17, 2013, pp. 1-3, XP032679434.

\* cited by examiner

APPARATUS FOR TRANSMITTING OPTICAL SIGNALS BETWEEN A CENTRAL UNIT AND AT LEAST ONE REMOTE UNIT

The present invention relates to an apparatus for transmitting optical signals between a central unit and at least one remote unit.

It is known in the prior art that a passive optical network (PON) is a particular type of access network, e.g. a network which allows a plurality of users to connect to a central network node.

A PON generally comprises an optical line terminal (OLT) and an optical distribution network (ODN) comprising a plurality of optical connections and passive optical components arranged so as to form a point-to-multipoint structure. The OLT is normally arranged in a central office of the service provider.

Each optical connection of the OLT can terminated at its most distant end by a respective optical network unit (ONU), which may be located in a user's house, alongside the sidewalk near several buildings, etc.

In a passive optical network (PON) of the wavelength division multiplexing (WDM) type, each ONU can communicate with the OLT using a respective pair of wavelengths comprising an upstream wavelength (for transmitting from the ONU to the OLT) and a downstream wavelength (for transmitting from the OLT to the ONU).

In a WDM PON, the ODN typically comprises a so-called "remote node", a feeder optical fiber which connects the remote node to the OLT and a given number of distribution optical fibers which radiate from the remote node. Each distribution fiber may be terminated on its distant end by an ONU or a feeder splitter which connects the distribution fiber to a plurality of ONUs by means of multiple optical fibers.

The remote node is typically a passive node, i.e. comprising only passive components (typically array waveguide grating (AWG), couplers, etc.) which do not require power.

In downstream direction, the OLT generates optical signals whose wavelengths are associated with the ONUs, according to the WDM technique, which is known to the skilled person in the art, and transmits them to the remote node along the feeder fiber. At the remote node, the downstream signals are demultiplexed and each one is forwarded to a respective ONU along a respective distribution fiber and a respective wavelength.

In upstream direction, each ONU generates a respective upstream signal with associated wavelength and transmit it along the respective distribution fiber to the remote node. The remote node multiples all upstream signals received from the various ONUs according to the known WDM technique and forwards them to the OLTs by means of the feeder fiber. The upstream signals are demultiplexed and subjected to subsequent processing at the OLT.

A network of the WDM-PON type with high-speed connection is described in "400 Gb/s (40×10 Gb/s) ASE injection seeded WDM-PON based on SOA-REAM" by Kim et al., OFC/NFOEC Technical Digest© 2013 Optical Society of America.

Two 1×40 cyclic AWGs of 100 GHz channel spacing are used on an optical line terminal (OLT) arranged at a central office of the service provider and at the remote node for transmitting signals in two-directional manner with a single optical fiber. The output spectrum of a broadband light source (BLS) is sliced by the AWG at the remote node and the part concerning the output channel is injected to the ONU. The SOA-REAM (semiconductor optical amplifier-reflective electro-absorption modulator) modules of the optical network terminals make an optical amplification with electro-absorption modulation. The output of the SOA-REAM modules is sent to the receiver passing through two AWGs and an optical fiber.

A dispersion compensation fiber (DCF) is used at the OLT so as to improve the transmission bit error rate (BER) in order to compensate for the chromatic dispersion of the optical fiber.

Using a circulator in the OLT arranged in the central office does not allow to filter the light deriving from the ONU.

Normally, the passive optical networks (PON) are not of the colorless type (colorless means that the devices at the ONU are not color sensitive but are universal: this provides advantage in terms of reducing the stock items); different approaches have been made for colorless modules which can be inserted in PON networks.

A network of the WDM-PON type with colorless optical network unit (ONU) is described in the article "Polarization in Retracing Circuits for WDM-PON", by Martinelli et al., IEEE PHOTONICS TECHNOLOGY LETTERS, vol. 24, No. 14, 15 Jul. 2012, pages 1191-1193. The article suggests a self-tuning cavity transmitter STCT optical circuit which comprises a Faraday mirror with rotatory capability arranged at the remote node, an AWG, a distribution fiber and a Faraday rotator and a reflective semiconductor optical amplifier or RSOA arranged in the ONU; a directly modulated laser cavity is arranged between the mirror of the RSOA arranged in the ONU and the Faraday rotator mirror arranged at the remote node.

In view of the prior art, it is the object of the present invention to provide an apparatus for transmitting optical signals between a central unit and at least one remote unit which has the advantages of the transmission apparatuses of the prior art illustrated above.

According to the present invention, such an object is achieved by an apparatus for transmitting optical signals between a central unit and at least one remote unit, said apparatus comprising the central unit and the remote unit, said central unit comprising:

at least one amplified spontaneous emission source of an optical signal, first means configured to polarize the optical signal deriving from the amplified spontaneous emission source in a first polarization plane by forming a first polarized optical signal, characterized in that said apparatus comprises second means configured to receive said first polarized optical signal to polarize it in a second polarization plane, orthogonal to the first plane, by forming in said first means a second optical signal which is orthogonally polarized with respect to the first optical signal.

The features and advantages of the present invention will become apparent from the following detailed description of practical embodiments thereof, shown by way of non-limitative example in the accompanying drawings, in which.

Figure 1:
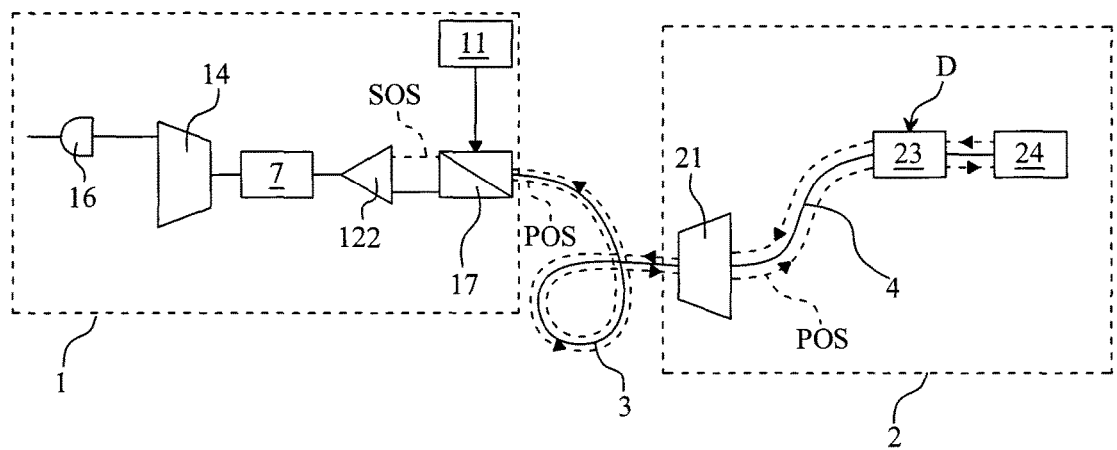
FIG. 1 is a diagram of an apparatus for transmitting optical signals between a central unit and at least one remote unit in accordance with an embodiment of the present invention.

FIG. 1 describes a diagram of an apparatus for transmitting optical signals between a central unit 1 and at least one remote unit 2 in accordance with an embodiment of the present invention. The central unit 1 comprises an amplified spontaneous emission source or ASE 11 which emits optical signals, preferably chaotic light at a given central wavelength $\lambda 1$.

The central control unit 1 comprises first means 17 adapted to polarize the optical signal deriving from the ASE 11 in a first polarization plane, preferably a vertical polarization plane, by forming a first polarized optical signal POS; the first means 17 preferably comprise polarizing beam splitter or PBS.

The apparatus comprises second means 24 configured to receive said first polarized optical signal POS and to reflect it with a polarization orthogonal to input polarization, that is to polarize the first polarized optical signal POS in a second polarization plane, orthogonal to the first plane, preferably a horizontal polarization plane, by forming in said first means 17 a second optical signal SOS which is orthogonally polarized with respect to the first optical signal POS; the second means 24 preferably comprise a Faraday rotator mirror 24 with, for example, rotatory capability of 45°. In this way the signal SOS is completely decoupled from the signal POS. The second means 24 are configured not only to reflect the signal POS but even to change the polarization state of the signal POS.

Preferably, a variable absorber 23 is associated with the Faraday rotator mirror 24; said variable absorber 23 acts on the first polarized optical signal POS and is preferably a semiconductor optical amplifier or SOA controlled by a pulse signal D.

In the case of an upstream optical signal transmission apparatus (shown in FIG. 1), the PBS 17 reflects the first optical signal POS without loss and sends it to the feeder fiber 3.

The first optical signal POS of the feeder fiber 3 is intercepted by an AWG 21 situated near the remote unit 2. The AWG 21 is of the cyclical type and is a multiplexer/demultiplexer preferably having two bandwidths at two different wavelengths which correspond to the upstream wavelength and the downstream wavelength. The AWG 21 generates the two different wavelengths and presents a number of output/input channels labelled by the two wavelengths.

The AWG 21 allows the first optical signal POS to pass at the given wavelength $\lambda 1$ to the remote unit 2; the first optical signal POS passes to another optical fiber 4, which leads towards the SOA 23 and towards the Faraday rotator mirror 24 both arranged in the remote unit 2. The first optical signal POS which arrives at the SOA 23 is modulated by means of the signal D; the SOA 23 is sensitive to low polarization.

The optical signal which returns from the remote unit 2 to the PBS 17 is orthogonally polarized with respect to the first optical signal POS arriving at the remote unit 2 by means of the Faraday rotator mirror 24; a second optical signal SOS, which is orthogonally polarized with respect to the first optical signal POS, e.g. horizontally, so as to ensure no loss and complete decoupling between the first and the second optical signal, is formed in the PBS 17 in this manner.

The central unit 1 preferably comprises an optical amplifier 122 of the second optical signal SOS and another AWG 14, which receives the second amplified optical signal and sends it to a receiver 16.

Preferably, the central unit 1 comprises a dispersion compensation fiber or DCF 7 in the case of very long optical fiber connections between central unit 1 and remote unit 2. The DCF 7 allows to solve the problem of chromatic dispersion; thereby, the second optical signal SOS which enters into the AWG 14 is sent without loss to the receiver 16.

Figure 2:
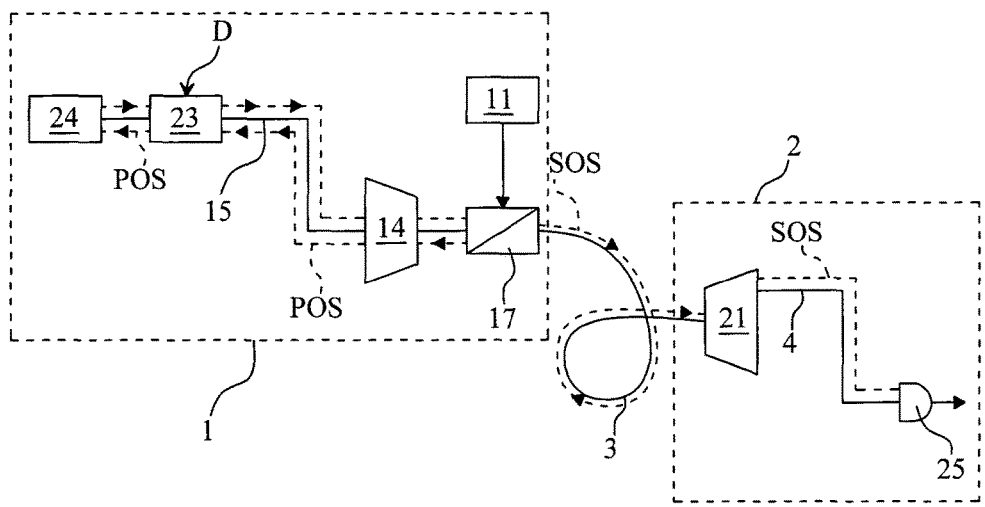
FIG. 2 is a diagram of an apparatus for transmitting optical signals between a central unit and at least one remote unit in accordance with a variant of the embodiment of the present invention.

In the case of an apparatus for transmitting optical signals between a central unit 1 and at least one remote unit 2 in downstream (shown in FIG. 2), according to a variant of the embodiment of the present invention, the PBS 17 reflects the first optical signal POS without loss and sends it towards the second means 24 arranged in the central unit 1. The first optical signal POS deriving from the PBS 17 is intercepted by the AWG 14 situated near the central unit 1.

The AWG 14 allows the first optical signal POS to pass at the given wavelength $\lambda 1$ to the second means 24, preferably the Faraday rotator mirror with rotatory capability of 45°; preferably, the first optical signal POS passes in the variable absorber 23, preferably a SOA, and then towards the Faraday rotator mirror 24, both arranged in the central unit 1. The first optical signal POS which arrives at the SOA 23 is modulated by means of the signal D; the SOA 23 is not very sensitive to polarization.

The optical signal which returns from the central unit 1 towards the PBS 17 is orthogonally polarized with respect to the first optical signal POS arriving at the central unit 1 by means of the Faraday rotator mirror; a second optical signal SOS, which is orthogonally polarized with respect to the first optical signal POS, e.g. horizontally, so as to ensure no loss and a complete decoupling between the first and the second optical signal, is formed in the PBS 17 in this manner.

The second optical signal SOS is sent into the feeder fiber 3 and is intercepted by the AWG 21 which allows the first optical signal POS to pass at the given wavelength $\lambda 1$ to the remote unit 2; the first optical signal POS passes into another optical fiber 4, which carries it towards the receiver 25.

In the case of an apparatus for transmitting optical signals operating both in downstream and in upstream (shown in FIGS. 3 and 4), the apparatus for transmitting optical signals between a central unit 1 and at least one remote unit 2 according to a variant of the embodiment of the present invention comprises second means 24 arranged in the central unit 1 and in the remote unit 2. Preferably, also the variable absorbing means 23 of the first optical signal POS, preferably SOA, are arranged in the central unit 1 and in the remote unit 2 and are associated with the second means 24.

Two amplified spontaneous emission sources or ASE 11, 110, which emit respective optical signals, preferably chaotic light, at two given central wavelengths $\lambda 1$ and $\lambda 2$, are provided. The peculiarity is that the sources 11, 110 are arranged in the central unit 1 even if the communication is a bi-directional communication.

In the case of upstream optical signal transmission (shown in FIG. 3), the PBS 17 reflects the first optical signal POS at the wavelength $\lambda 1$ deriving from the ASE 11 without loss and sends it to the feeder fiber 3; the ASE source 110 and the PBS 170 (shown with a dashed line in FIG. 3) are not used in this case.

The first optical signal POS from the feeder fiber 3 is intercepted by an AWG 21 situated near the remote unit 2. The AWG 21 is of the cyclical type and is a multiplexer/demultiplexer preferably having two bandwidths at the two different wavelengths λ1, λ2, which correspond to the used upstream and downstream wavelengths.

The AWG 21 allows the first optical signal POS to pass at the given wavelength λ1 to the remote unit 2; the first optical signal POS passes in another optical fiber 4 which leads towards the SOA 23 and towards the Faraday rotator mirror 24 both arranged in the remote unit 2. The first optical signal POS which arrives at the SOA 23 is modulated by means of the signal D; the SOA 23 is sensitive to low polarization.

The optical signal which returns from the remote unit 2 to the PBS 17 is orthogonally polarized with respect to the first optical signal POS arriving at the remote unit 2 by means of the Faraday rotator mirror; a second optical signal SOS, which is orthogonally polarized with respect to the first optical signal POS, e.g. horizontally, so as to ensure no loss and a complete uncoupling between the first and the second optical signal, is formed in the PBS 17 in this manner.

The central unit 1 preferably comprises another AWG 14 which receives the second amplified optical signal and sends it to a receiver 16.

In the case of downstream optical signal transmission (shown in FIG. 4), the PBS 170 reflects the first optical signal POS at the wavelength λ2 deriving from the ASE 110 without loss and sends it towards the second means 24 arranged in the central unit 1; the ASE source 11 and the PBS 17 (shown with a dashed line in FIG. 4) are not used in this case. The first optical signal POS deriving from the PBS 170 is intercepted by the AWG 14 situated near the central unit 1.

The AWG 14 allows the first optical signal POS to pass at the given wavelength λ1 to the second means 24, preferably the Faraday rotator mirror with rotatory capability of 45°; preferably, the first optical signal POS passes in the variable absorber 23, preferably a SOA, and then towards the Faraday rotator mirror 24 both arranged in the central unit 1. The first optical signal POS which arrives at the SOA 23 is modulated by means of the signal D; the SOA 23 is sensitive to low polarization.

The AWG 14 is also of the cyclical type and is a multiplexer/demultiplexer preferably having two bandwidths at the two different wavelengths λ1, λ2, which correspond to the used upstream and downstream wavelengths.

The optical signal which returns from the central unit 1 to the PBS 170 is orthogonally polarized with respect to the first optical signal POS arriving at the central unit 1 by means of the Faraday rotator mirror; a second optical signal SOS, which is orthogonally polarized with respect to the first optical signal POS, e.g. horizontally, so as to ensure no loss and a complete decoupling between the first and the second optical signal, is formed in the PBS 170 in this manner.

The second optical signal SOS is sent in the feeder fiber 3 and is intercepted by the AWG 21 which allows the first optical signal POS to pass at the given wavelength λ2 to the remote unit 2; the first optical signal POS passes in another optical fiber 4 which carries it towards the receiver 25.

Figure 3:
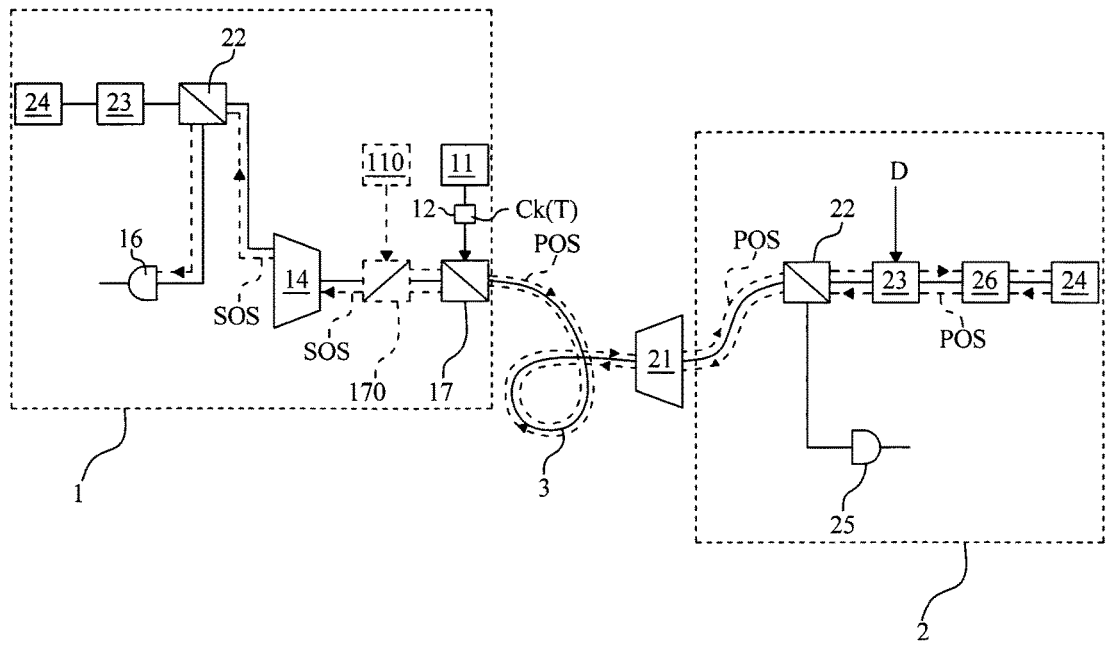
FIGS. 3-4 show diagrams of an apparatus for transmitting optical signals between a central unit and at least one remote unit in accordance with another variant of the embodiment of the present invention.
Figure 4:
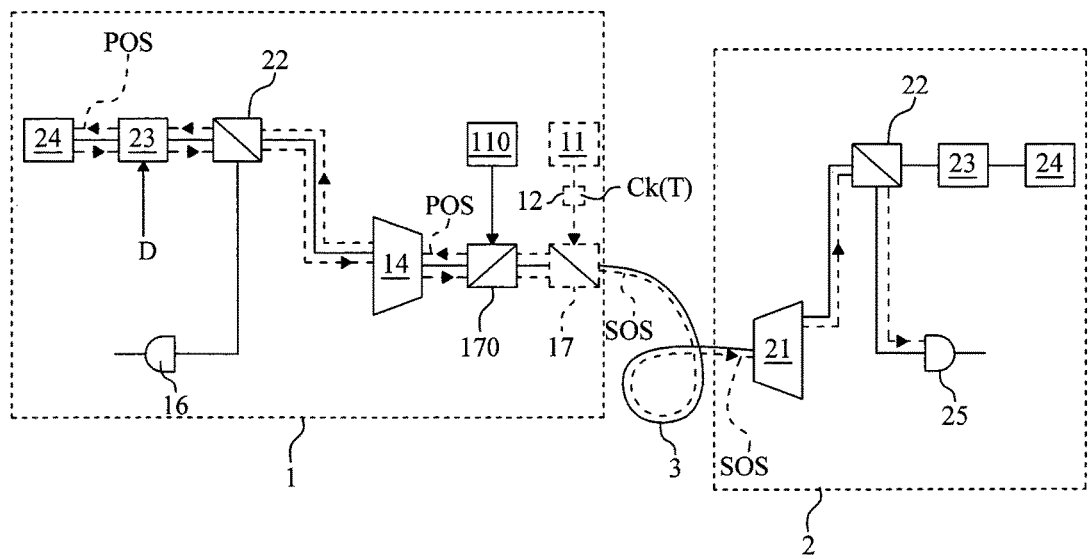

Preferably, the apparatus for transmitting optical signals between a central unit 1 and at least one remote unit 2 of FIGS. 3 and 4 comprises a pair of wave shifters or WDM splitters 22 which can decouple the upstream mode which occurs in a given wavelength range from the downstream mode which occurs in a different wavelength range; a WDM splitter 22 is arranged in the central unit 1 and the other in the remote unit 2.

Each receiver of the receivers 16, 25 may be a given optical receiver, e.g. a PIN diode or a photo diode.

Using the PBS in the apparatus for transmitting optical signals between a central unit 1 and at least one remote unit 2 allows to block the return dispersion light of the feeder fiber 3 so as to improve the signal/noise ratio.

Using the Faraday rotator mirror 24 in the apparatus for transmitting optical signals between a central unit 1 and at least one remote unit 2 allows to uncouple the first optical signal POS, i.e. the starting optical signal, from the second optical signal SOS, i.e. the return optical signal.

Preferably, the optical signal deriving from the ASE 11 is overmodulated by means of a modulator 12 controlled by a synchronism or clock signal ck(t) so as to allow to share a common clock signal on all distribution networks.

Preferably, the remote unit comprises a beam splitter 26 in order to monitor the first optical signal POS and the clock signal ck(t).

An application of the apparatus for transmitting and receiving electromagnetic signals according to the present invention concerns the telephony network. The remote unit antennas (RU) of the radio access network are controlled centrally by base bandwidth units (BBU). The connection between base bandwidth units and remote units is established by means of upstream signals (from the remote units to the base bandwidth units) or downstream signals (from the base bandwidth units to the remote units) on radio connections.

The invention claimed is:

1. Apparatus for transmitting optical signals between a central unit and at least one remote unit, said apparatus comprising said central unit and said at least one remote unit,
said central unit comprising:
at least one amplified spontaneous emission source of an optical signal; and
first means configured to polarize the optical signal deriving from the amplified spontaneous emission source in a first polarization plane by forming a first polarized optical signal (POS),
said apparatus further comprising:
second means configured to receive said first polarized optical signal to polarize it in a second polarization plane, orthogonal to the first plane, by forming in said first means a second optical signal (SOS) which is orthogonally polarized with respect to the first polarized optical signal, and
wherein said second means is arranged both in the central unit and in the remote unit, said central unit comprising two amplified spontaneous emission sources of optical signals at two different central wavelengths respectively used for up-stream and down-stream transmissions and two first means adapted to polarize optical signals at two different wavelengths in the first polarization plane, each one of said central unit and said remote unit comprising a WDM splitter configured to decouple the up-stream transmission modality from the down-stream transmission modality.

2. Apparatus according to claim 1, wherein said first means comprises a polarizing beam splitter.

3. Apparatus according to claim 1, wherein said second means comprises a Faraday rotator mirror.

4. Apparatus according to claim 3, wherein said Faraday rotator mirror has rotatory capability of 45 degrees.

5. Apparatus according to claim 1, further comprising variable absorbing means of the first polarized optical signal (POS) which are associated with said second means.

6. Apparatus according to claim 5, wherein said variable absorbing means of the first polarized optical signal (POS) comprises a semiconductor optical amplifier.

7. Apparatus according to claim 1, wherein said first polarization plane is a vertical plane and said second polarization plane is a horizontal plane.

* * * * *